United States Patent
Wang (10) Patent No.: US 10,333,659 B2
(45) Date of Patent: Jun. 25, 2019

(54) DATA TRANSMISSION METHOD, DEVICE, AND SYSTEM

(71) Applicant: Huawei Technologies Co., Ltd., Shenzhen (CN)

(72) Inventor: Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/557,661

(22) PCT Filed: Mar. 13, 2015

(86) PCT No.: PCT/CN2015/074221
§ 371 (c)(1),
(2) Date: Sep. 12, 2017

(87) PCT Pub. No.: WO2016/145576
PCT Pub. Date: Sep. 22, 2016

(65) Prior Publication Data
US 2018/0069666 A1    Mar. 8, 2018

(51) Int. Cl.
*H04L 1/18*  (2006.01)
*H04W 52/48*  (2009.01)
(Continued)

(52) U.S. Cl.
CPC ........... *H04L 1/1887* (2013.01); *H04L 1/16* (2013.01); *H04L 1/1812* (2013.01); *H04L 1/1893* (2013.01); *H04L 5/0055* (2013.01); *H04W 16/14* (2013.01); *H04W 52/48* (2013.01); *H04L 5/0007* (2013.01); *H04L 27/2613* (2013.01)

(58) Field of Classification Search
None
See application file for complete search history.

(56) References Cited

U.S. PATENT DOCUMENTS

2010/0031110 A1* 2/2010 Seok ............... H04L 1/1621
714/748
2010/0257419 A1* 10/2010 Sung ............... G06F 11/1443
714/748
(Continued)

FOREIGN PATENT DOCUMENTS

CN    101562511 A    10/2009
CN    102202408 A    9/2011
(Continued)

OTHER PUBLICATIONS

Ericsson, "Discussion on UL HARQ handling in LAA," XP050933791, R1-150583, Feb. 9-13, 2015, 2 pages.
(Continued)

*Primary Examiner* — Marcus Smith
*Assistant Examiner* — Gautam Sharma
(74) *Attorney, Agent, or Firm* — Conley Rose, P.C.

(57) ABSTRACT

A data transmission method, a device, and a system for data transmission includes a first device that determines a hybrid automatic repeat request (HARQ) process number of a first subframe according to an HARQ process number of a second subframe, the first device sends the first subframe and the second subframe to a second device, and the second subframe includes the HARQ process number of the second subframe.

12 Claims, 3 Drawing Sheets

(51) Int. Cl.
*H04L 1/16* (2006.01)
*H04W 16/14* (2009.01)
*H04L 5/00* (2006.01)
*H04L 27/26* (2006.01)

(56) References Cited

U.S. PATENT DOCUMENTS

| | | | |
|---|---|---|---|
| 2012/0207122 A1* | 8/2012 | Kim | H04W 72/044 370/329 |
| 2013/0016686 A1 | 1/2013 | Li et al. | |
| 2013/0201930 A1 | 8/2013 | Okino et al. | |
| 2013/0223411 A1* | 8/2013 | Zhang | H04W 52/365 370/335 |
| 2014/0029552 A1* | 1/2014 | Lv | H04L 1/1887 370/329 |
| 2016/0095133 A1* | 3/2016 | Hwang | H04L 1/00 370/329 |

FOREIGN PATENT DOCUMENTS

| | | |
|---|---|---|
| CN | 102573074 A | 7/2012 |
| CN | 102860106 A | 1/2013 |
| CN | 103199965 A | 7/2013 |
| CN | 103648175 A | 3/2014 |
| EP | 2685772 A1 | 1/2014 |
| WO | 2014171754 A1 | 10/2014 |

OTHER PUBLICATIONS

Nokia Corporation, "Overview of possible LAA impact to RAN2," XP050952217, R2-150188, Feb. 9-13, 2015, 8 pages.
Foreign Communication From a Counterpart Application, European Application No. 15884960.4, Extended European Search Report dated Feb. 8, 2018, 11 pages.
Machine Translation and Abstract of Chinese Publication No. CN102573074, Jul. 11, 2012, 28 pages.
Machine Translation and Abstract of Chinese Publication No. CN103199965, Jul. 10, 2013, 13 pages.
Machine Translation and Abstract of International Publication No. WO2014171754, Oct. 23, 2014, 34 pages.
Foreign Communication From a Counterpart Application, PCT Application No. PCT/CN2015/074221, English Translation of International Search Report dated Dec. 22, 2015, 2 pages.
Foreign Communication From a Counterpart Application, PCT Application No. PCT/CN2015/074221, English Translation of Written Opinion dated Dec. 22, 2015, 5 pages.
Machine Translation and Abstract of Chinese Publication No. CN101562511, dated Oct. 21, 2009, 13 pages.
Foreign Communication From a Counterpart Application, Chinese Application No. 201580058766.8, Chinese Office Action dated Apr. 2, 2019, 7 pages.

* cited by examiner

DATA TRANSMISSION METHOD, DEVICE, AND SYSTEM

CROSS-REFERENCE TO RELATED APPLICATIONS

This application is a National Stage Application of International Patent Application No. PCT/CN2015/074221, filed on Mar. 13, 2015, which is herein incorporated by reference in its entirety.

TECHNICAL FIELD

The present disclosure relates to the communications field, and in particular, to a data transmission method, a device, and a system.

BACKGROUND

In a wireless communications network, each device needs to transmit information by using frequency resources. Frequency resources are also referred to as spectrums. Spectrums may include licensed spectrums and unlicensed spectrums. The licensed spectrums are dedicated frequency resources of some operators, and the unlicensed spectrums are frequency resources for public use in the wireless communications network. With development of communications technologies, an amount of information transmitted in the wireless communications network increases on a daily basis, a data throughput in the wireless communications network may be improved by preempting an unlicensed spectrum to transmit information, so as to better satisfy user requirements.

In other approaches, a Hybrid Automatic Repeat Request (HARQ) manner is usually used to transmit data. For example, after a first device sends data to a second device, the second device feeds back an Acknowledgement/Negative Acknowledgement (ACK/NACK) message to the first device. The first device determines, according to feedback information of the second device, whether to transmit the data again or transmit another version of the data to the second device until the data is correctly transmitted. This data transmission process is an HARQ process. An HARQ process for each time of data transmission has an HARQ process number, so as to distinguish between different HARQ processes. In a scenario in which data is transmitted by preempting an unlicensed spectrum, after a device successfully preempts a channel of the unlicensed spectrum, data may be sent at a random moment. As a result, the device may not send the data at a starting moment of a complete subframe, that is, a first subframe sent by the device may not be a complete subframe. In this case, how to determine an HARQ process number of this incomplete subframe is a problem to be solved urgently.

SUMMARY

Embodiments of the present disclosure provide a data transmission method, a device, and a system, so as to resolve problems with other approaches that an HARQ process number of an incomplete subframe cannot be determined.

To achieve the foregoing objective, the embodiments of the present disclosure use the following technical solutions.

According to a first aspect, an embodiment of the present disclosure provides a data transmission method, including determining, by a first device, an HARQ process number of a first subframe according to an HARQ process number of a second subframe, where the first subframe includes M orthogonal frequency division multiplexing (OFDM) symbols, the second subframe includes N OFDM symbols, M and N are positive integers, and M≤N; and sending, by the first device, the first subframe and the second subframe to a second device, where the second subframe includes the HARQ process number of the second subframe.

With reference to the first aspect, in a first possible implementation of the first aspect, the second subframe includes first control signaling, and the first control signaling includes the HARQ process number of the second subframe.

With reference to the first aspect or the first possible implementation of the first aspect, in a second possible implementation of the first aspect, the second subframe is a $P^{th}$ subframe sent before the first subframe, and P is a positive integer.

With reference to the first aspect or the first possible implementation of the first aspect, in a third possible implementation of the first aspect, the second subframe is a $Q^{th}$ subframe sent after the first subframe, and Q is a positive integer.

With reference to any one of the first aspect to the third possible implementation of the first aspect, in a fourth possible implementation of the first aspect, determining, by a first device, an HARQ process number of a first subframe according to an HARQ process number of a second subframe includes determining, by the first device, the HARQ process number of the first subframe according to a first formula $x=y+i$ or a second formula $x=y-i$, where x is the HARQ process number of the first subframe, y is the HARQ process number of the second subframe, and i is a positive integer.

With reference to any one of the first aspect to the fourth possible implementation of the first aspect, in a fifth possible implementation of the first aspect, the method further includes receiving, by the first device, an ACK/NACK message of the first subframe sent by the second device, where the ACK/NACK message of the first subframe is used to indicate whether the second device correctly receives the first subframe, and the ACK/NACK message of the first subframe includes the HARQ process number of the first subframe.

According to a second aspect, an embodiment of the present disclosure provides a data transmission method, including receiving, by a second device, a first subframe and a second subframe that are sent by a first device, where the second subframe includes an HARQ process number of the second subframe, the first subframe includes M OFDM symbols, the second subframe includes N OFDM symbols, M and N are positive integers, and M≤N; and determining, by the second device, an HARQ process number of the first subframe according to the HARQ process number of the second subframe.

With reference to the second aspect, in a first possible implementation of the second aspect, the second subframe includes first control signaling, and the first control signaling includes the HARQ process number of the second subframe.

With reference to the second aspect or the first possible implementation of the second aspect, in a second possible implementation of the second aspect, the second subframe is a $P^{th}$ subframe sent before the first subframe, and P is a positive integer.

With reference to the second aspect or the first possible implementation of the second aspect, in a third possible implementation of the second aspect, the second subframe is a $Q^{th}$ subframe sent after the first subframe, and Q is a positive integer.

With reference to any one of the second aspect to the third possible implementation of the second aspect, in a fourth possible implementation of the second aspect, determining, by the second device, an HARQ process number of the first subframe according to the HARQ process number of the second subframe includes determining, by the second device, the HARQ process number of the first subframe according to a first formula $x=y+i$ or a second formula $x=y-i$, where x is the HARQ process number of the first subframe, y is the HARQ process number of the second subframe, and i is a positive integer.

With reference to any one of the second aspect to the fourth possible implementation of the second aspect, in a fifth possible implementation of the second aspect, the method further includes sending, by the second device, an ACK/NACK message of the first subframe to the first device, where the ACK/NACK message of the first subframe is used to indicate whether the second device correctly receives the first subframe, and the ACK/NACK message of the first subframe includes the HARQ process number of the first subframe.

According to a third aspect, an embodiment of the present disclosure provides a first device, including a process management unit, configured to determine an HARQ process number of a first subframe according to an HARQ process number of a second subframe, where the first subframe includes M OFDM symbols, the second subframe includes N OFDM symbols, M and N are positive integers, and M≤N; and a sending unit, configured to send the first subframe and the second subframe to the second device, where the second subframe includes the HARQ process number of the second subframe.

With reference to the third aspect, in a first possible implementation of the third aspect, the second subframe includes a first control signaling, and the first control signaling includes the HARQ process number of the second subframe.

With reference to the third aspect or the first possible implementation of the third aspect, in a second possible implementation of the third aspect, the second subframe is a $P^{th}$ subframe sent before the first subframe, and P is a positive integer.

With reference to the third aspect or the first possible implementation of the third aspect, in a third possible implementation of the third aspect, the second subframe is a $Q^{th}$ subframe sent after the first subframe, and Q is a positive integer.

With reference to any one of the third aspect to the third possible implementation of the third aspect, in a fourth possible implementation of the third aspect, the process management unit is specifically configured to determine the HARQ process number of the first subframe according to a first formula $x=y+i$ or a second formula $x=y-i$, where x is the HARQ process number of the first subframe, y is the HARQ process number of the second subframe, and i is a positive integer.

With reference to any one of the third aspect to the fourth possible implementation of the third aspect, in a fifth possible implementation of the third aspect, the first device further includes a receiving unit, configured to receive an ACK/NACK message of the first subframe sent by the second device, where the ACK/NACK message of the first subframe is used to indicate whether the second device correctly receives the first subframe, and the ACK/NACK message of the first subframe includes the HARQ process number of the first subframe.

According to a fourth aspect, an embodiment of the present disclosure provides a second device, including a receiving unit, configured to receive a first subframe and a second subframe that are sent by a first device, where the second subframe includes an HARQ process number of the second subframe, the first subframe includes M OFDM symbols, the second subframe includes N OFDM symbols, M and N are positive integers, and M≤N; and a process management unit, configured to determine an HARQ process number of the first subframe according to the HARQ process number of the second subframe.

With reference to the fourth aspect, in a first possible implementation of the fourth aspect, the second subframe includes a first control signaling, and the first control signaling includes the HARQ process number of the second subframe.

With reference to the fourth aspect or the first possible implementation of the fourth aspect, in a second possible implementation of the fourth aspect, the second subframe is a $P^{th}$ subframe sent before the first subframe, and P is a positive integer.

With reference to the fourth aspect or the first possible implementation of the fourth aspect, in a third possible implementation of the fourth aspect, the second subframe is a $Q^{th}$ subframe sent after the first subframe, and Q is a positive integer.

With reference to any one of the fourth aspect to the third possible implementation of the fourth aspect, in a fourth possible implementation of the fourth aspect, the process management unit is specifically configured to determine the HARQ process number of the first subframe according to a first formula $x=y+i$ or a second formula $x=y-i$, where x is the HARQ process number of the first subframe, y is the HARQ process number of the second subframe, and i is a positive integer.

With reference to any one of the fourth aspect to the fourth possible implementation of the fourth aspect, in a fifth possible implementation of the fourth aspect, the second device further includes a sending unit, configured to send an ACK/NACK message of the first subframe to the first device, where the ACK/NACK message of the first subframe is used to indicate whether the second device correctly receives the first subframe, and the ACK/NACK message of the first subframe includes the HARQ process number of the first subframe.

According to a fifth aspect, an embodiment of the present disclosure provides a first device, including a processor, a memory, a transmitter, and a bus, where the processor, the memory, and the transmitter are connected by using the bus; the processor is configured to determine an HARQ process number of a first subframe according to an HARQ process number of a second subframe, where the first subframe includes M OFDM symbols, the second subframe includes N OFDM symbols, M and N are positive integers, and M≤N; and the transmitter is configured to send the first subframe and the second subframe to a second device, where the second subframe includes the HARQ process number of the second subframe.

With reference to the fifth aspect, in a first possible implementation of the fifth aspect, the second subframe includes a first control signaling, and the first control signaling includes the HARQ process number of the second subframe.

With reference to the fifth aspect or the first possible implementation of the fifth aspect, in a second possible implementation of the fifth aspect, the second subframe is a $P^{th}$ subframe sent before the first subframe, and P is a positive integer.

With reference to the fifth aspect or the first possible implementation of the fifth aspect, in a third possible implementation of the fifth aspect, the second subframe is a $Q^{th}$ subframe sent after the first subframe, and Q is a positive integer.

With reference to any one of the fifth aspect to the third possible implementation of the fifth aspect, in a fourth possible implementation of the fifth aspect, the processor is specifically configured to determine the HARQ process number of the first subframe according to a first formula x=y+i or a second formula x=y−i, where x is the HARQ process number of the first subframe, y is the HARQ process number of the second subframe, and i is a positive integer.

With reference to any one of the fifth aspect to the fourth possible implementation of the fifth aspect, in a fifth possible implementation of the fifth aspect, the first device further includes a receiver, and the receiver is connected to the processor, the memory, and the transmitter by using the bus; and the receiver is configured to receive an ACK/NACK message of the first subframe sent by the second device, where the ACK/NACK message of the first subframe is used to indicate whether the second device correctly receives the first subframe, and the ACK/NACK message of the first subframe includes the HARQ process number of the first subframe.

According to a sixth aspect, an embodiment of the present disclosure provides a second device, including a processor, a memory, a receiver, and a bus, where the processor, the memory, and the receiver are connected by using the bus; the receiver is configured to receive a first subframe and a second subframe that are sent by a first device, where the second subframe includes an HARQ process number of the second subframe, the first subframe includes M OFDM symbols, the second subframe includes N OFDM symbols, M and N are positive integers, and M≤N; and the processor is configured to determine an HARQ process number of the first subframe according to the HARQ process number of the second subframe.

With reference to the sixth aspect, in a first possible implementation of the sixth aspect, the second subframe includes a first control signaling, and the first control signaling includes the HARQ process number of the second subframe.

With reference to the sixth aspect or the first possible implementation of the sixth aspect, in a second possible implementation of the sixth aspect, the second subframe is a $P^{th}$ subframe sent before the first subframe, and P is a positive integer.

With reference to the sixth aspect or the first possible implementation of the sixth aspect, in a third possible implementation of the sixth aspect, the second subframe is a $Q^{th}$ subframe sent after the first subframe, and Q is a positive integer.

With reference to any one of the sixth aspect to the third possible implementation of the sixth aspect, in a fourth possible implementation of the sixth aspect, the processor is specifically configured to determine the HARQ process number of the first subframe according to a first formula x=y+i or a second formula x=y−i, where x is the HARQ process number of the first subframe, y is the HARQ process number of the second subframe, and i is a positive integer.

With reference to any one of the sixth aspect to the fourth possible implementation of the sixth aspect, in a fifth possible implementation of the sixth aspect, the first device further includes a transmitter, and the transmitter is connected to the processor, the memory, and the receiver by using the bus; and the transmitter is configured to send an ACK/NACK message of the first subframe to the first device, where the ACK/NACK message of the first subframe is used to indicate whether the second device correctly receives the first subframe, and the ACK/NACK message of the first subframe includes the HARQ process number of the first subframe.

According to a seventh aspect, an embodiment of the present disclosure provides a wireless communications system, including a first device and a second device, where the first device is the first device in the third aspect or any possible implementation of the third aspect, and the second device is the second device in the fourth aspect or any possible implementation of the fourth aspect; or the first device is the first device in the fifth aspect or any possible implementation of the fifth aspect, and the second device is the second device in the sixth aspect or any possible implementation of the sixth aspect.

In a data transmission method, a device, and a system that are provided in the embodiments of the present disclosure, a first device determines an HARQ process number of a first subframe according to an HARQ process number of a second subframe, the first device sends the first subframe and the second subframe to a second device, and the second subframe includes the HARQ process number of the second subframe. In this way, the second device may determine the HARQ process number of the first subframe according to an HARQ process of the second subframe without needing additional signaling overheads, thereby resolving a problem with other approaches that an HARQ process number of an incomplete subframe cannot be determined.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be understood that the technical solutions of the embodiments of the present disclosure may be applied to various communications systems, for example, Global System for Mobile Communications (GSM) system, a code division multiple access (CDMA) system, a wideband code division multiple access (WCDMA) system, a General Packet Radio Service (GPRS), a Long Term Evolution (LTE) system, an LTE frequency division duplex (FDD) system, an LTE time division duplex (TDD), a Universal Mobile Telecommunications System (UMTS), and a Worldwide Interoperability for Microwave Access (WiMAX) communications system.

It should be understood that in the embodiments of the present disclosure, a first device or a second device includes, but is not limited to, user equipment (UE), a mobile station (MS), a mobile terminal, a mobile telephone, a handset, portable equipment, and the like. The UE may communicate with one or more core networks by using a radio access network (RAN). For example, the UE may be a mobile telephone (or referred to as a "cellular" phone), or a computer having a wireless communication function. The UE may also be a portable, pocket-sized, handheld, computer built-in, or in-vehicle mobile apparatus.

In the embodiments of the present disclosure, the first device or the second device may be a base transceiver station (BTS) in GSM or CDMA, or may be a NodeB in WCDMA, or may be an evolved NodeB (eNB or e-NodeSt) in LTE, which is not limited in the embodiments of the present disclosure.

It should be understood that, in the embodiments of the present disclosure, "first" and "second" are used for distinguishing only, and are not limitative in the embodiments of the present disclosure.

Figure 1:
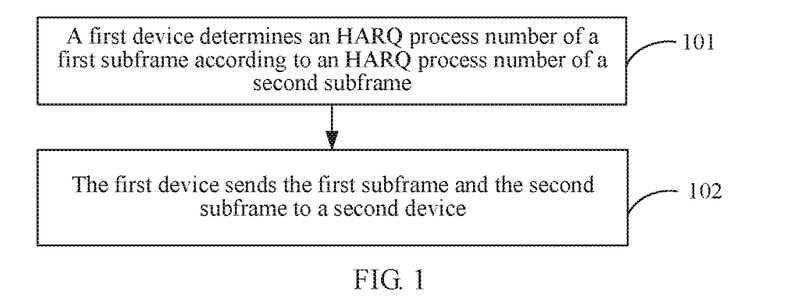
FIG. 1 is a schematic flowchart of a data transmission method according to an embodiment of the present disclosure.

An embodiment of the present disclosure provides a data transmission method, and is applied to an LTE system. As shown in FIG. 1, the method includes the following steps.

Step 101: A first device determines an HARQ process number of a first subframe according to an HARQ process number of a second subframe.

The second subframe is sent before the first subframe, or the second subframe is sent after the first subframe. The first subframe includes M OFDM symbols, the second subframe includes N OFDM symbols, M and N are positive integers, and M≤N. N may be 12 or 14. When a subframe uses an ordinary Cyclic Prefix (CP), one subframe includes 14 OFDM symbols, and N may be 14. When a subframe uses an extended CP, one subframe includes 12 OFDM symbols. The first device may be a base station in an LTE system.

Further optionally, the second subframe is a $P^{th}$ subframe sent before the first subframe, and P is an integer greater than 0. P is preconfigured by the system, or P is determined by the first device.

Alternatively, optionally, the second subframe is a $Q^{th}$ subframe sent after the first subframe, and Q is an integer greater than 0. Q is preconfigured by the system, or Q is determined by the first device.

The first device sends data to a second device. The second device feeds back an ACK/NACK message to the first device. The first device determines, according to feedback information of the second device, whether to transmit the data again or transmit another version of the data to the second device until the data is correctly transmitted. This data transmission process is an HARQ process. The HARQ process number of the first subframe is used to mark an HARQ process of data transmitted on the first subframe, and the HARQ process number of the second subframe is used to mark an HARQ process of data transmitted on the second subframe.

The first device may determine the HARQ process number of the first subframe according to the following two manners.

Optionally, in a first application scenario, the first device determines the HARQ process number of the first subframe according to a first formula $x=y+i$, where x is the HARQ process number of the first subframe, y is the HARQ process number of the second subframe, and i is an integer greater than 0.

Optionally, in a second application scenario, the first device determines the HARQ process number of the first subframe according to a second formula $x=y-i$, where x is the HARQ process number of the first subframe, y is the HARQ process number of the second subframe, and i is an integer greater than 0.

Step 102: The first device sends the first subframe and the second subframe to a second device.

The second subframe includes the HARQ process number of the second subframe.

Optionally, the second subframe includes first control signaling, and the first control signaling includes the HARQ process number of the second subframe. The first control signaling is control signaling of the second subframe and is used to indicate resource scheduling of the second subframe. In addition, it should be noted that in an implementation, the first control signaling is included in Downlink Control Information (DCI) of the second subframe. The DCI of the second subframe is used to indicate resource scheduling of the second subframe and includes information such as resource Allocation (RA) and Modulation and coding scheme (MCS) of the second subframe. Moreover, the DCI of the second subframe synchronously indicates resource scheduling of the first subframe in a multiplexing manner, and includes information such as RA and MCS of the first subframe. Certainly, if the first device does not send the first control signaling, the DCI of the second subframe may still indicate the resource scheduling of the first subframe in a multiplexing manner, and this is not limited in the present disclosure.

Optionally, after step 102, the first device may receive the ACK/NACK message of the first subframe sent by the second device. The ACK/NACK message of the first subframe is used to indicate whether the second device correctly receives data on the first subframe, and the ACK/NACK message of the first subframe includes the HARQ process number of the first subframe. The ACK message is used to indicate that the second device correctly receives the data on the first subframe. The NACK message is used to indicate that the second device does not correctly receive the data on the first subframe, and in this case, the first device needs to retransmit the data carried on the first subframe to the second device. Further optionally, in an asynchronous HARQ manner, the ACK/NACK message of the first subframe is sent on a fourth subframe after the first subframe. Certainly, here is merely an example for description, and the present disclosure is not limited thereto.

The data transmission method provided in this embodiment may be applied to a scenario of preempting an unlicensed spectrum. The first subframe is a first subframe sent by the first device after the unlicensed spectrum is preempted. A start moment of the first subframe may not be a start moment of a complete subframe. Usually, a time length occupied by a subframe is 1 millisecond, and includes 14 OFDM symbols. The first subframe may be less than 1 millisecond, and a quantity of OFDM symbols included in the first subframe may be less than 14. The second subframe may be a complete subframe, that is, a time length occupied by the second subframe is 1 millisecond, and includes 14 OFDM symbols. The control signaling of the second subframe includes the HARQ process number of the second subframe. When the first device sends the data carried on the second subframe, the first device also sends the control signaling of the second subframe. In this case, the second device determines the HARQ process number of the first subframe according to the HARQ process number of the second subframe, and no more signaling overheads are required to indicate the HARQ process number of the first subframe, thereby reducing signaling overheads.

In addition, if the first device sends the DCI of the first subframe, the data transmission method provided in this embodiment may be used without needing to include signaling indicating the HARQ process number of the first subframe, thereby reducing signaling overheads.

In the data transmission method provided in this embodiment of the present disclosure, a first device determines an HARQ process number of a first subframe according to an HARQ process number of a second subframe, the first device sends the first subframe and the second subframe to a second device, and the second subframe includes the HARQ process number of the second subframe. In this way, the second device may determine the HARQ process number of the first subframe according to an HARQ process of the second subframe without needing additional signaling overheads, thereby resolving a problem with other approaches that an HARQ process number of an incomplete subframe cannot be determined.

Figure 2:
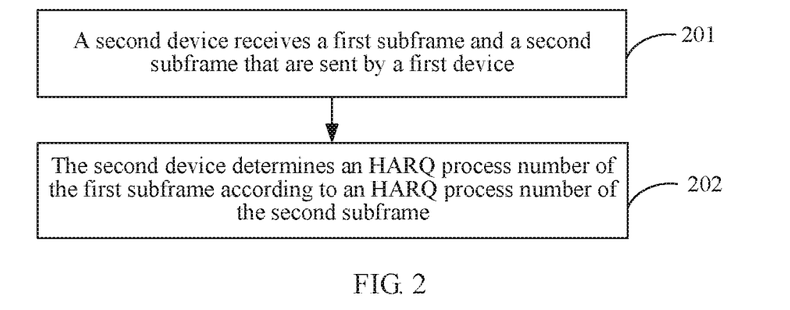
FIG. 2 is a schematic flowchart of a data transmission method according to another embodiment of the present disclosure.

With reference to the foregoing embodiment corresponding to FIG. 1, another embodiment of the present disclosure provides a data transmission method. The method corresponds to a receiving side of data transmission in the embodiment corresponding to FIG. 1, and is applied to an LTE system. As shown in FIG. 2, the method includes the following steps.

Step 201: A second device receives a first subframe and a second subframe that are sent by a first device.

The second subframe includes an HARQ process number of the second subframe. The second subframe is sent before the first subframe, or the second subframe is sent after the first subframe. The first subframe includes M OFDM symbols, the second subframe includes N OFDM symbols, M and N are positive integers, and M≤N. N may be 12 or 14. When a subframe uses an ordinary CP, one subframe includes 14 OFDM symbols, and N may be 14. When a subframe uses an extended CP, one subframe includes 12 OFDM symbols. The second device may be user equipment in an LTE system.

Further optionally, the second subframe is a $P^{th}$ subframe sent before the first subframe, and P is an integer greater than 0. P is preconfigured by the system, or P is determined and sent to the second device by the first device.

Alternatively, optionally, the second subframe is a $Q^{th}$ subframe sent after the first subframe, and Q is an integer greater than 0. Q is preconfigured by the system, or Q is determined and sent to the second device by the first device.

Optionally, the second subframe includes a first control signaling, and the first control signaling includes the HARQ process number of the second subframe. The first control signaling is control signaling of the second subframe and is used to indicate resource scheduling of the second subframe. In addition, it should be noted that in an implementation, the first control signaling is included in DCI of the second subframe. The DCI of the second subframe is used to indicate resource scheduling of the second subframe and includes information such as RA and MCS of the second subframe. Moreover, the DCI of the second subframe synchronously indicates resource scheduling of the first subframe in a multiplexing manner, and includes information such as RA and MCS of the first subframe. Certainly, if the first device does not send the first control signaling, the DCI of the second subframe may still indicate the resource scheduling of the first subframe in a multiplexing manner, and this is not limited in the present disclosure.

Step 202: The second device determines an HARQ process number of the first subframe according to an HARQ process number of the second subframe.

The first device sends data to the second device. The second device feeds back an ACK/NACK message to the first device. The first device determines, according to feedback information of the second device, whether to transmit the data again or transmit another version of the data to the second device until the data is correctly transmitted. Such a process of data transmission is an HARQ process. The HARQ process number of the first subframe is used to mark an HARQ process of data transmitted on the first subframe, and the HARQ process number of the second subframe is used to mark an HARQ process of data transmitted on the second subframe.

The second device may determine the HARQ process number of the first subframe according to the following two manners.

Optionally, in a first application scenario, the second device determines the HARQ process number of the first subframe according to a first formula x=y+i, where x is the HARQ process number of the first subframe, y is the HARQ process number of the second subframe, and i is an integer greater than 0.

Optionally, in a second application scenario, the second device determines the HARQ process number of the first subframe according to a second formula x=y−i, where x is the HARQ process number of the first subframe, y is the HARQ process number of the second subframe, and i is an integer greater than 0.

Optionally, after step 202, the second device may send the ACK/NACK message of the first subframe to the first device. The ACK/NACK message of the first subframe is used to indicate whether the second device correctly receives data on the first subframe, and the ACK/NACK message of the first subframe includes the HARQ process number of the first subframe. The ACK message is used to indicate that the second device correctly receives the data on the first subframe. The NACK message is used to indicate that the second device does not correctly receive the data on the first subframe, and in this case, the first device needs to retransmit the data carried on the first subframe to the second device. Further optionally, in an asynchronous HARQ manner, the ACK/NACK message of the first subframe is sent on a fourth subframe after the first subframe. Certainly, this is merely an example for description, and the present disclosure is not limited thereto.

In the data transmission method provided in this embodiment of the present disclosure, a second device receives a first subframe and a second subframe that are sent by a first device, and the second subframe includes an HARQ process number of the second subframe. An HARQ process number of the first subframe is determined according to the HARQ process number of the second subframe. In this way, the second device may determine the HARQ process number of the first subframe according to an HARQ process of the second subframe without needing additional signaling overheads, thereby resolving a problem with other approaches that an HARQ process number of an incomplete subframe cannot be determined.

Figure 3:
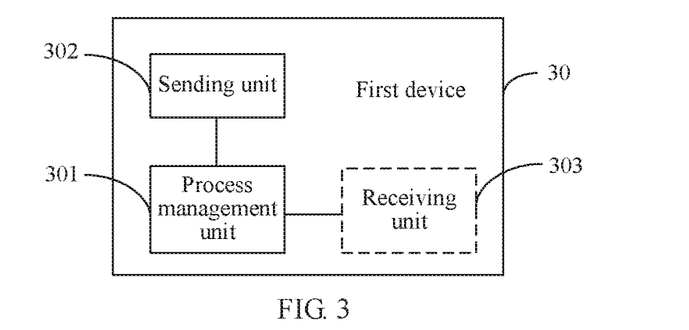
FIG. 3 is a schematic structural diagram of a first device according to an embodiment of the present disclosure.

Based on the foregoing embodiment corresponding to FIG. 1, this embodiment of the present disclosure provides a first device, configured to perform the data transmission method described in the foregoing embodiment corresponding to FIG. 1. As shown in FIG. 3, the first device 30 includes a process management unit 301 and a sending unit 302.

The process management unit 301 is configured to determine an HARQ process number of a first subframe according to an HARQ process number of a second subframe. The first subframe includes M OFDM symbols, the second subframe includes N OFDM symbols, M and N are positive integers, and M≤N.

The sending unit 302 is configured to send the first subframe and the second subframe to a second device. The second subframe includes the HARQ process number of the second subframe.

Optionally, the second subframe is sent before the first subframe, or the second subframe is sent after the first subframe. The first device may be a base station in an LTE system.

Further optionally, the second subframe is a $P^{th}$ subframe sent before the first subframe, and P is an integer greater than 0. P is preconfigured by the system, or P is determined by the first device.

Alternatively, optionally, the second subframe is a $Q^{th}$ subframe sent after the first subframe, and Q is an integer greater than 0. Q is preconfigured by the system, or Q is determined by the first device.

The first device sends data to the second device. The second device feeds back an ACK/NACK message to the first device. The first device determines, according to feedback information of the second device, whether to transmit the data again or transmit another version of the data to the second device until the data is correctly transmitted. Such a process of data transmission is an HARQ process. The HARQ process number of the first subframe is used to mark an HARQ process of data transmitted on the first subframe, and the HARQ process number of the second subframe is used to mark an HARQ process of data transmitted on the second subframe.

Optionally, the second subframe includes a first control signaling, and the first control signaling includes the HARQ process number of the second subframe. The first control signaling is control signaling of the second subframe and is used to indicate resource scheduling of the second subframe. In addition, it should be noted that in an implementation, the first control signaling is included in DCI of the second subframe. The DCI of the second subframe is used to indicate resource scheduling of the second subframe and includes information such as RA and MCS of the second subframe. Moreover, the DCI of the second subframe synchronously indicates resource scheduling of the first subframe in a multiplexing manner, and includes information such as RA and MCS of the first subframe. Certainly, if the first device does not send the first control signaling, the DCI of the second subframe may still indicate the resource scheduling of the first subframe in a multiplexing manner, and this is not limited in the present disclosure.

Optionally, the process management unit 301 is configured to determine the HARQ process number of the first subframe according to a first formula x=y+i or a second formula x=y−i, where x is the HARQ process number of the first subframe, y is the HARQ process number of the second subframe, and i is a positive integer.

Optionally, the first device 30 further includes a receiving unit 303 configured to receive an ACK/NACK message of the first subframe sent by the second device. The ACK/NACK message of the first subframe is used to indicate whether the second device correctly receives the first subframe, and the ACK/NACK message of the first subframe includes the HARQ process number of the first subframe.

The first device provided in this embodiment of the present disclosure determines an HARQ process number of a first subframe according to an HARQ process number of a second subframe, the first device sends the first subframe and the second subframe to a second device, and the second subframe includes the HARQ process number of the second subframe. In this way, the second device may determine the HARQ process number of the first subframe according to an HARQ process of the second subframe without needing additional signaling overheads, thereby resolving a problem with other approaches that an HARQ process number of an incomplete subframe cannot be determined.

Figure 4:
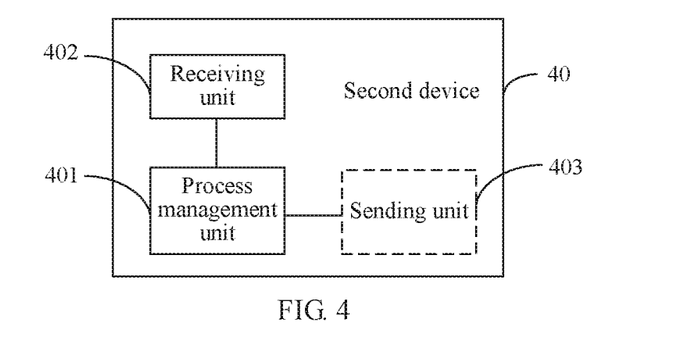
FIG. 4 is a schematic structural diagram of a second device according to an embodiment of the present disclosure.

Based on the foregoing embodiment corresponding to FIG. 2, this embodiment of the present disclosure provides a second device, configured to perform the data transmission method described in the foregoing embodiment corresponding to FIG. 2. As shown in FIG. 4, the second device 40 includes a process management unit 401 and a receiving unit 402.

The receiving unit 402 is configured to receive a first subframe and a second subframe that are sent by a first device. The second subframe includes an HARQ process number of the second subframe, the first subframe includes M OFDM symbols, the second subframe includes N OFDM symbols, M and N are positive integers, and M≤N.

The process management unit 401 is configured to determine an HARQ process number of the first subframe according to the HARQ process number of the second subframe.

Optionally, the second subframe is sent before the first subframe, or the second subframe is sent after the first subframe. The second device may be user equipment in an LTE system.

Further optionally, the second subframe is a $P^{th}$ subframe sent before the first subframe, and P is an integer greater than 0. P is preconfigured by the system, or P is determined and sent to the second device by the first device.

Alternatively, optionally, the second subframe is a $Q^{th}$ subframe sent after the first subframe, and Q is an integer greater than 0. Q is preconfigured by the system, or Q is determined and sent to the second device by the first device.

The first device sends data to the second device. The second device feeds back an ACK/NACK message to the first device. The first device determines, according to feedback information of the second device, whether to transmit the data again or transmit another version of the data to the second device until the data is correctly transmitted. Such a process of data transmission is an HARQ process. The HARQ process number of the first subframe is used to mark an HARQ process of data transmitted on the first subframe, and the HARQ process number of the second subframe is used to mark an HARQ process of data transmitted on the second subframe.

Optionally, the second subframe includes a first control signaling, and the first control signaling includes the HARQ process number of the second subframe. The first control signaling is control signaling of the second subframe and is used to indicate resource scheduling of the second subframe. In addition, it should be noted that in an implementation, the first control signaling is included in DCI of the second subframe. The DCI of the second subframe is used to indicate resource scheduling of the second subframe and includes information such as RA and MCS of the second subframe. Moreover, the DCI of the second subframe synchronously indicates resource scheduling of the first subframe in a multiplexing manner, and includes information such as RA and MCS of the first subframe. Certainly, if the first device does not send the first control signaling, the DCI of the second subframe may still indicate the resource scheduling of the first subframe in a multiplexing manner, and this is not limited in the present disclosure.

Optionally, the process management unit 401 is specifically configured to determine the HARQ process number of the first subframe according to a first formula $x=y+i$ or a second formula $x=y-i$, where x is the HARQ process number of the first subframe, y is the HARQ process number of the second subframe, and i is a positive integer.

Optionally, the second device 40 further includes a sending unit 403, configured to send an ACK/NACK message of the first subframe to the first device. The ACK/NACK message of the first subframe is used to indicate whether the second device correctly receives the first subframe, and the ACK/NACK message of the first subframe includes the HARQ process number of the first subframe.

The second device provided in this embodiment of the present disclosure receives a first subframe and a second subframe that are sent by a first device, and the second subframe includes an HARQ process number of the second subframe. An HARQ process number of the first subframe is determined according to the HARQ process number of the second subframe. In this way, the second device may determine the HARQ process number of the first subframe according to an HARQ process of the second subframe without needing additional signaling overheads, thereby resolving a problem with other approaches that an HARQ process number of an incomplete subframe cannot be determined.

Figure 5:
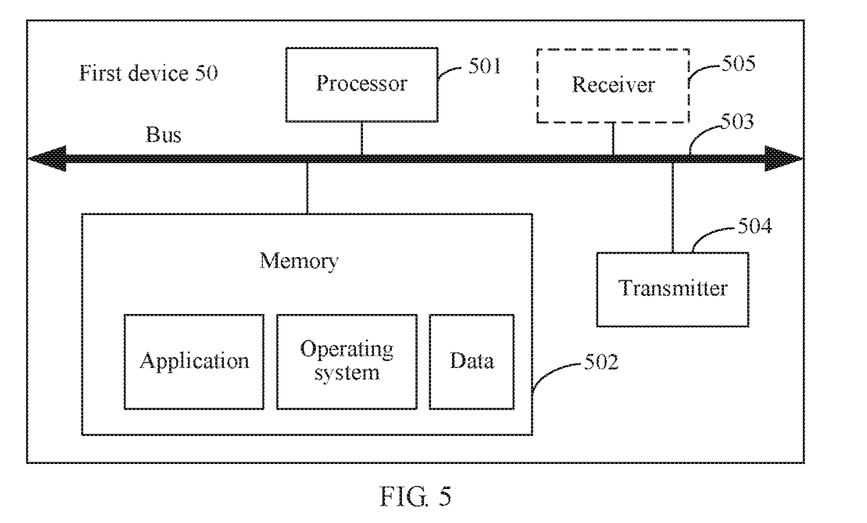
FIG. 5 is a schematic structural diagram of a first device according to another embodiment of the present disclosure.

Based on the foregoing embodiment corresponding to FIG. 1, another embodiment of the present disclosure provides a first device, configured to perform the data transmission method described in the foregoing embodiment corresponding to FIG. 1. As shown in FIG. 5, the first device 50 includes at least one processor 501, a memory 502, a bus 503, and a transmitter 504. The at least one processor 501, the memory 502, and the transmitter 504 are connected by using the bus 503 and complete mutual communication.

The bus 503 may be an Industry Standard Architecture (ISA) bus, a Peripheral Component interconnect (PCI) bus, an Extended Industry Standard Architecture (EISA) bus, or the like. The bus 503 may be classified into an address bus, a data bus, a control bus, and the like. For ease of representation, only a bold line is used for representation in FIG. 5, but it does not represent that there is only one bus or one type of bus.

The memory 502 is used for application program code for executing the solution of the present disclosure. The application program code for executing the solution of the present disclosure is stored in the memory, and is controlled and executed by the processor 501.

The memory may be a read-only memory (ROM) or a static storage device of another type that can store static information and an instruction; a random access memory (RAM) or a dynamic storage device of another type that can store information and an instruction; or an electrically erasable programmable read-only memory (EEPROM), a compact disc read-only memory (CD-ROM) or other optical disk storages, optical disc storages (including a compact disc, a laser disc, an optical disc, a digital versatile disc, a Blu-ray disc, or the like), a disk storage medium or other disk storages, or any other medium that can be used to carry or store expected program code in an instruction or a data structure form and that can be accessed by a computer, but is not limited thereto. These memories are connected to the processor by using the bus.

The processor 501 may be a central processing unit (CPU), an application-specific integrated circuit (ASIC), or one or more integrated circuits configured to implement this embodiment of the present disclosure.

The processor 501 is configured to call program code in the memory 502, to implement the following functions in a possible implementation when the foregoing application program is executed by the processor 501.

The processor 501 is configured to determine an HARQ process number of a first subframe according to an HARQ process number of a second subframe. The first subframe includes M OFDM symbols, the second subframe includes N OFDM symbols, M and N are positive integers, and M≤N.

The transmitter 504 is configured to send the first subframe and the second subframe to a second device. The second subframe includes the HARQ process number of the second subframe.

Optionally, the second subframe is sent before the first subframe, or the second subframe is sent after the first subframe. The first device may be a base station in an LTE system.

Further optionally, the second subframe is a $P^{th}$ subframe sent before the first subframe, and P is an integer greater than 0. P is preconfigured by the system, or P is determined by the first device.

Alternatively, optionally, the second subframe is a $Q^{th}$ subframe sent after the first subframe, and Q is an integer greater than 0. Q is preconfigured by the system, or Q is determined by the first device.

The first device sends data to the second device. The second device feeds back an ACK/NACK message to the first device. The first device determines, according to feedback information of the second device, whether to transmit the data again or transmit another version of the data to the second device until the data is correctly transmitted. Such a process of data transmission is an HARQ process. The HARQ process number of the first subframe is used to mark an HARQ process of data transmitted on the first subframe, and the HARQ process number of the second subframe is used to mark an HARQ process of data transmitted on the second subframe.

Optionally, the second subframe includes a first control signaling, and the first control signaling includes the HARQ process number of the second subframe. The first control signaling is control signaling of the second subframe and is used to indicate resource scheduling of the second subframe. In addition, it should be noted that in an implementation, the first control signaling is included in DCI of the second subframe. The DCI of the second subframe is used to indicate resource scheduling of the second subframe and includes information such as RA and MCS of the second subframe. Moreover, the DCI of the second subframe synchronously indicates resource scheduling of the first subframe in a multiplexing manner, and includes information such as RA and MCS of the first subframe. Certainly, if the first device does not send the first control signaling, the DCI of the second subframe may still indicate the resource scheduling of the first subframe in a multiplexing manner, and this is not limited in the present disclosure.

Optionally, the processor 501 is specifically configured to determine the HARQ process number of the first subframe according to a first formula $x=y+i$ or a second formula $x=y-i$, where x is the HARQ process number of the first subframe, y is the HARQ process number of the second subframe, and i is a positive integer.

Optionally, the first device 50 further includes a receiver 505, and the receiver 505 is connected to the processor 501, the memory 502, and the transmitter 504 by using the bus 503.

The receiver 505 is configured to receive an ACK/NACK message of the first subframe sent by the second device. The ACK/NACK message of the first subframe is used to indicate whether the second device correctly receives the first subframe, and the ACK/NACK message of the first subframe includes the HARQ process number of the first subframe.

The first device provided in this embodiment of the present disclosure determines an HARQ process number of a first subframe according to an HARQ process number of a second subframe, the first device sends the first subframe and the second subframe to a second device, and the second subframe includes the HARQ process number of the second subframe. In this way, the second device may determine the HARQ process number of the first subframe according to an HARQ process of the second subframe without needing additional signaling overheads, thereby resolving a problem with other approaches that an HARQ process number of an incomplete subframe cannot be determined.

Figure 6:
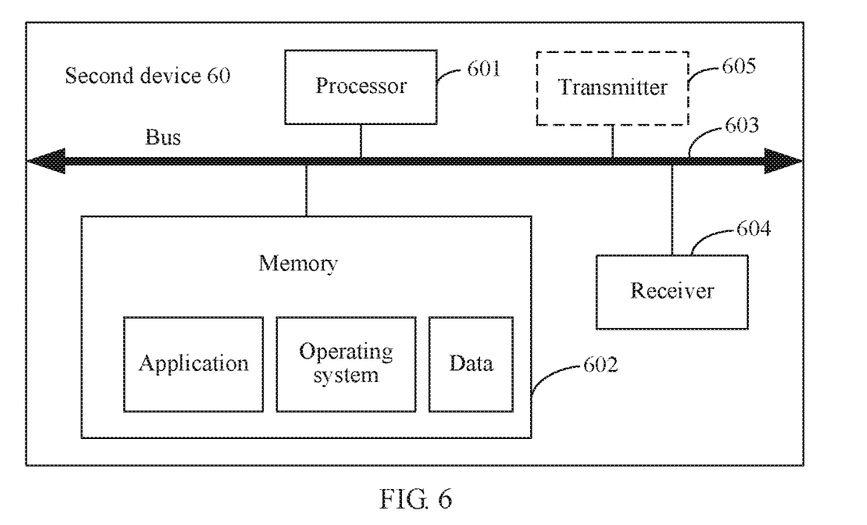
FIG. 6 is a schematic structural diagram of a second device according to another embodiment of the present disclosure.

Based on the foregoing embodiment corresponding to FIG. 2, another embodiment of the present disclosure provides a second device, configured to perform the data transmission method described in the foregoing embodiment corresponding to FIG. 2. As shown in FIG. 6, the second device 60 includes at least one processor 601, a memory 602, a bus 603, and a receiver 604. The at least one processor 601, the memory 602, and the receiver 604 are connected by using the bus 603 and complete mutual communication.

The bus 603 may be an ISA bus, a PCI bus, an EISA bus, or the like. The bus 603 may be classified into an address bus, a data bus, a control bus, and the like. For ease of representation, only a bold line is used for representation in FIG. 6, but it does not represent that there is only one bus or one type of bus.

The memory 602 is used for application program code for executing the solution of the present disclosure. The application program code for executing the solution of the present disclosure is stored in the memory, and is controlled and executed by the processor 601.

The memory may be a ROM or a static storage device of another type that can store static information and an instruction; a RAM or a dynamic storage device of another type that can store information and an instruction; or an EEPROM, a CD-ROM or other optical disk storages, optical disc storages (including a compact disc, a laser disc, an optical disc, a digital versatile disc, a Blu-ray disc, or the like), a disk storage medium or other disk storages, or any other medium that can be used to carry or store expected program code in an instruction or a data structure form and that can be accessed by a computer, but is not limited thereto. These memories are connected to the processor by using the bus.

The processor 601 may be a CPU, an ASIC, or one or more integrated circuits configured to implement this embodiment of the present disclosure.

The receiver 604 is configured to receive a first subframe and a second subframe that are sent by a first device. The second subframe includes a HARQ process number of the second subframe, the first subframe includes M OFDM symbols, the second subframe includes N OFDM symbols, M and N are positive integers, and $M \leq N$.

The processor 601 is configured to determine an HARQ process number of the first subframe according to the HARQ process number of the second subframe.

Optionally, the second subframe is sent before the first subframe, or the second subframe is sent after the first subframe. The second device may be UE in an LTE system.

Further optionally, the second subframe is a $P^{th}$ subframe sent before the first subframe, and P is an integer greater than 0. P is preconfigured by the system, or P is determined and sent to the second device by the first device.

Alternatively, optionally, the second subframe is a $Q^{th}$ subframe sent after the first subframe, and Q is an integer greater than 0. Q is preconfigured by the system, or Q is determined and sent to the second device by the first device.

The first device sends data to the second device. The second device feeds back an ACK/NACK message to the first device. The first device determines, according to feedback information of the second device, whether to transmit the data again or transmit another version of the data to the second device until the data is correctly transmitted. Such a process of data transmission is an HARQ process. The HARQ process number of the first subframe is used to mark an HARQ process of data transmitted on the first subframe, and the HARQ process number of the second subframe is used to mark an HARQ process of data transmitted on the second subframe.

Optionally, the second subframe includes a first control signaling, and the first control signaling includes the HARQ process number of the second subframe. The first control signaling is control signaling of the second subframe and is used to indicate resource scheduling of the second subframe. In addition, it should be noted that in an implementation, the first control signaling is included in DCI of the second subframe. The DCI of the second subframe is used to indicate resource scheduling of the second subframe and includes information such as RA and MCS of the second subframe. Moreover, the DCI of the second subframe synchronously indicates resource scheduling of the first subframe in a multiplexing manner, and includes information such as RA and MCS of the first subframe. If the first device does not send the first control signaling, the DCI of the second subframe may still indicate the resource scheduling of the first subframe in a multiplexing manner, and this is not limited in the present disclosure.

Optionally, the processor 601 is specifically configured to determine the HARQ process number of the first subframe according to a first formula $x=y+i$ or a second formula $x=y-i$, where x is the HARQ process number of the first subframe, y is the HARQ process number of the second subframe, and i is a positive integer.

Optionally, the second device 60 further includes a transmitter 605, and the transmitter 605 is connected to the processor 601, the memory 602, and the receiver 604 by using the bus 603.

The transmitter 605 is configured to send an ACK/NACK message of the first subframe to the first device. The ACK/NACK message of the first subframe is used to indicate whether the second device correctly receives the first subframe, and the ACK/NACK message of the first subframe includes the HARQ process number of the first subframe.

The second device provided in this embodiment of the present disclosure receives a first subframe and a second subframe that are sent by a first device, and the second subframe includes a HARQ process number of the second subframe. An HARQ process number of the first subframe is determined according to the HARQ process number of the second subframe. In this way, the second device may determine the HARQ process number of the first subframe according to an HARQ process of the second subframe without needing additional signaling overheads, thereby resolving a problem with other approaches that an HARQ process number of an incomplete subframe cannot be determined.

Figure 7:
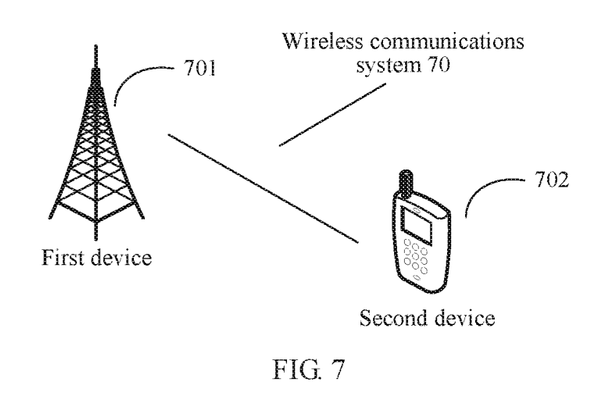
FIG. 7 is a schematic structural diagram of a wireless communications system according to an embodiment of the present disclosure.

Based on the foregoing embodiments corresponding to FIG. 1 to FIG. 6, this embodiment of the present disclosure provides a wireless communications system, configured to implement the data transmission methods described in the foregoing embodiments corresponding to FIG. 1 and FIG. 2. As shown in FIG. 7, the wireless communications system 70 includes a first device 701 and a second device 702.

The first device 701 is the first device described in the embodiment corresponding to FIG. 3, and the second device 702 is the second device described in the embodiment corresponding to FIG. 4.

Alternatively, the first device 701 is the first device described in the embodiment corresponding to FIG. 5, and the second device 702 is the second device described in the embodiment corresponding to FIG. 6.

The wireless communications system 70 belongs to an LTE system. The first device 701 may be a base station in the LTE system, and the second device 702 may be user equipment in the LTE system.

In the wireless communications system 70 provided in this embodiment of the present disclosure, the first device determines an HARQ process number of a first subframe according to an HARQ process number of a second subframe, the first device sends the first subframe and the second subframe to a second device, and the second subframe includes the HARQ process number of the second subframe. In this way, the second device may determine the HARQ process number of the first subframe according to an HARQ process of the second subframe without needing additional signaling overheads, thereby resolving a problem with other approaches that an HARQ process number of an incomplete subframe cannot be determined.

In addition, a computer readable medium (or medium) is further provided, including a computer readable instruction for performing the following operations which when executed performs operations of 101 and 102 or 201 and 202 in the methods of the foregoing embodiments.

In addition, a computer program product is further provided, including the foregoing computer readable medium.

It should be noted that the signaling mentioned herein includes, but is not limited to, an indication, information, a signal, a message, or the like, which is not limited herein.

The term "and/or" in this specification describes only an association relationship for describing associated objects and represents that three relationships may exist. For example, A and/or B may represent the following three cases where only A exists, both A and B exist, and only B exists.

In addition, the character "/" in this specification usually indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a Universal Serial Bus (USB) flash drive, a removable hard disk, a ROM, a RAM, a magnetic disk, or an optical disc.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited. The computer readable medium may include a RAM, a ROM, an EEPROM, a CD-ROM or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a Digital Subscriber Line (DSL) or wireless technologies such as infrared ray, radio and microwave, the coaxial cable, optical fiber/cable, twisted pair are included in fixation of a medium to which they belong. For example, a disk and a disc used by the present disclosure includes a Compact Disc (CD), a laser disc, an optical disc, a Digital Versatile Disc (DVD), a floppy disk and a Blu-ray disc, where the disk usually copies data by a magnetic means, and the disc copies data optically by a laser means. The foregoing combination should also be included in the protection scope of the computer-readable medium.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, comprising:
   determining, by a first device, a hybrid automatic repeat request (HARQ) process number of a first subframe according to either $x=y+i$ or $x=y-i$, x being the HARQ process number of the first subframe, y being an HARQ process number of a second subframe, and i being a positive integer, the first subframe comprising M orthogonal frequency division multiplexing (OFDM) symbols and the second subframe comprising N OFDM symbols, M and N being positive integers and $M \leq N$; and
   sending, by the first device, the first subframe and the second subframe to a second device, the second subframe comprising the HARQ process number of the second subframe.

2. The method of claim 1, wherein the second subframe comprises a first control signaling, the first control signaling comprising the HARQ process number of the second subframe.

3. The method of claim 1, wherein the second subframe is a Pth subframe that is sent before the first subframe, P being a positive integer greater than zero.

4. The method of claim 1, wherein the second subframe is a Qth subframe that is sent after the first subframe, Q being a positive integer greater than zero.

5. The method of claim 1, further comprising receiving, by the first device, an acknowledgement/negative acknowledgement (ACK/NACK) message of the first subframe from the second device, the ACK/NACK message of the first subframe being used to indicate whether the second device correctly receives the first subframe, and the ACK/NACK message of the first subframe comprising the HARQ process number of the first subframe.

6. A data transmission method, comprising:
   receiving, by a second device, a first subframe and a second subframe from a first device, the second subframe comprising a hybrid automatic repeat request (HARQ) process number of the second subframe, the first subframe comprising M orthogonal frequency division multiplexing (OFDM) symbols, the second subframe comprising N OFDM symbols, M and N being positive integers greater than zero, and $M \leq N$; and
   determining, by the second device, an HARQ process number of the first subframe according to either $x=y+i$ or $x=y-i$, x being the HARQ process number of the first subframe, y being the HARQ process number of the second subframe, and i being a positive integer.

7. The data transmission method of claim 6, wherein the second subframe comprises a first control signaling, the first control signaling comprising the HARQ process number of the second subframe.

8. The data transmission method of claim 6, wherein the second subframe is a $P^{th}$ subframe sent before the first subframe, P being a positive integer greater than zero.

9. The method of claim 6, wherein the second subframe is a $Q^{th}$ subframe sent after the first subframe, Q being a positive integer greater than zero.

10. The data transmission method of claim 6, further comprising sending, by the second device, an acknowledgement/negative acknowledgement (ACK/NACK) message of the first subframe to the first device, the ACK/NACK message of the first subframe indicating that the second device correctly received the first subframe, and the ACK/NACK message of the first subframe comprising the HARQ process number of the first subframe.

11. A first device, comprising:
    a processor configured to determine a hybrid automatic repeat request (HARQ) process number of a first subframe according to either $x=y+i$ or $x=y-i$, x being the HARQ process number of the first subframe, y being an HARQ process number of a second subframe, and i being a positive integer, the first subframe comprising M orthogonal frequency division multiplexing (OFDM) symbols, the second subframe comprising N OFDM symbols, M and N being positive integers greater than zero, and $M \leq N$; and
    a transmitter in communication with the processor and configured to send the first subframe and the second subframe to a second device, the second subframe comprising the HARQ process number of the second subframe.

12. The first device of claim 11, further comprising a receiver in communication with the processor and configured to receive an acknowledgement/negative acknowledgement (ACK/NACK) message of the first subframe from the second device, the ACK/NACK message of the first subframe indicating the second device correctly receives the first subframe, and the ACK/NACK message of the first subframe comprising the HARQ process number of the first subframe.

* * * * *